Patented Dec. 30, 1924.

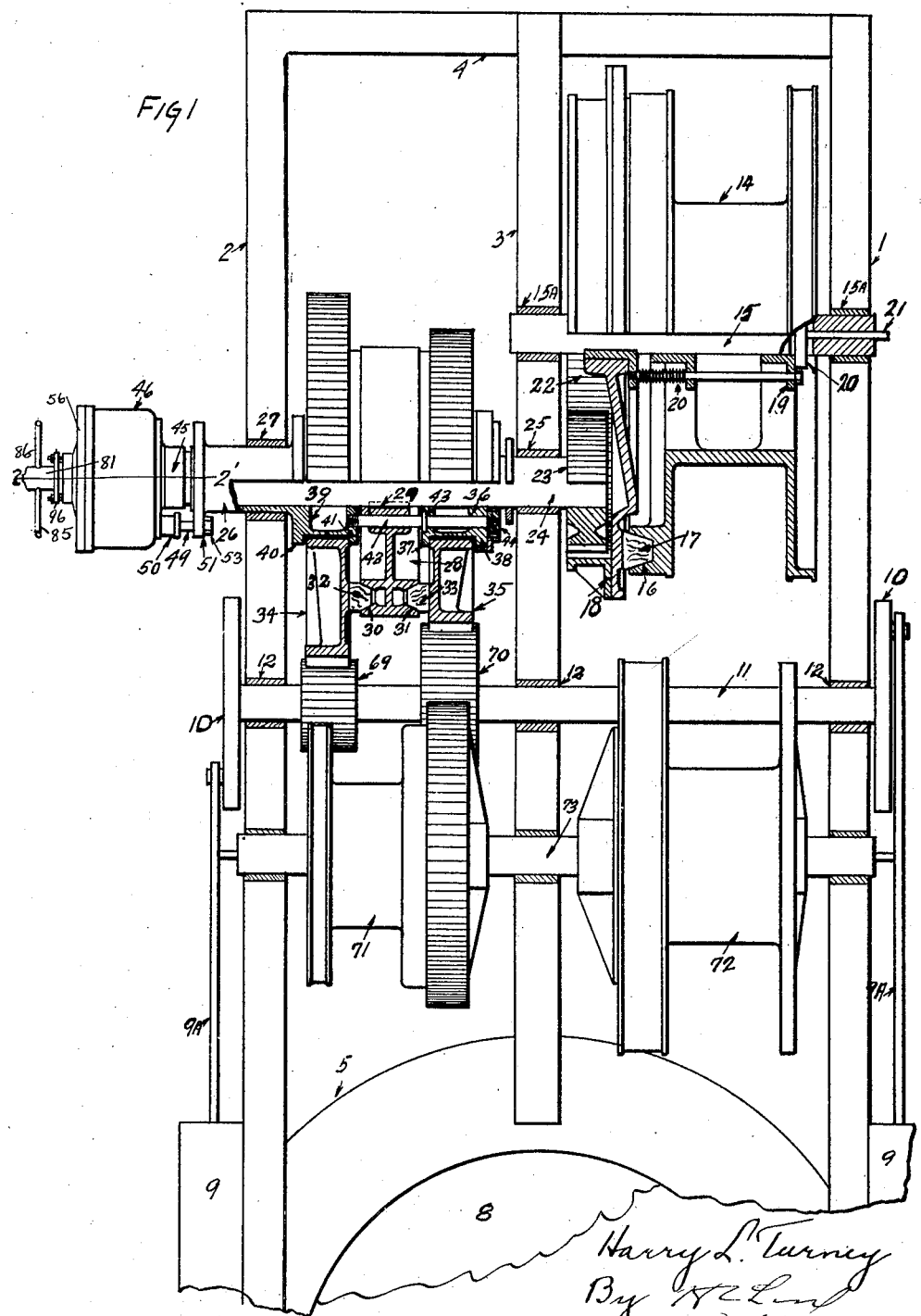

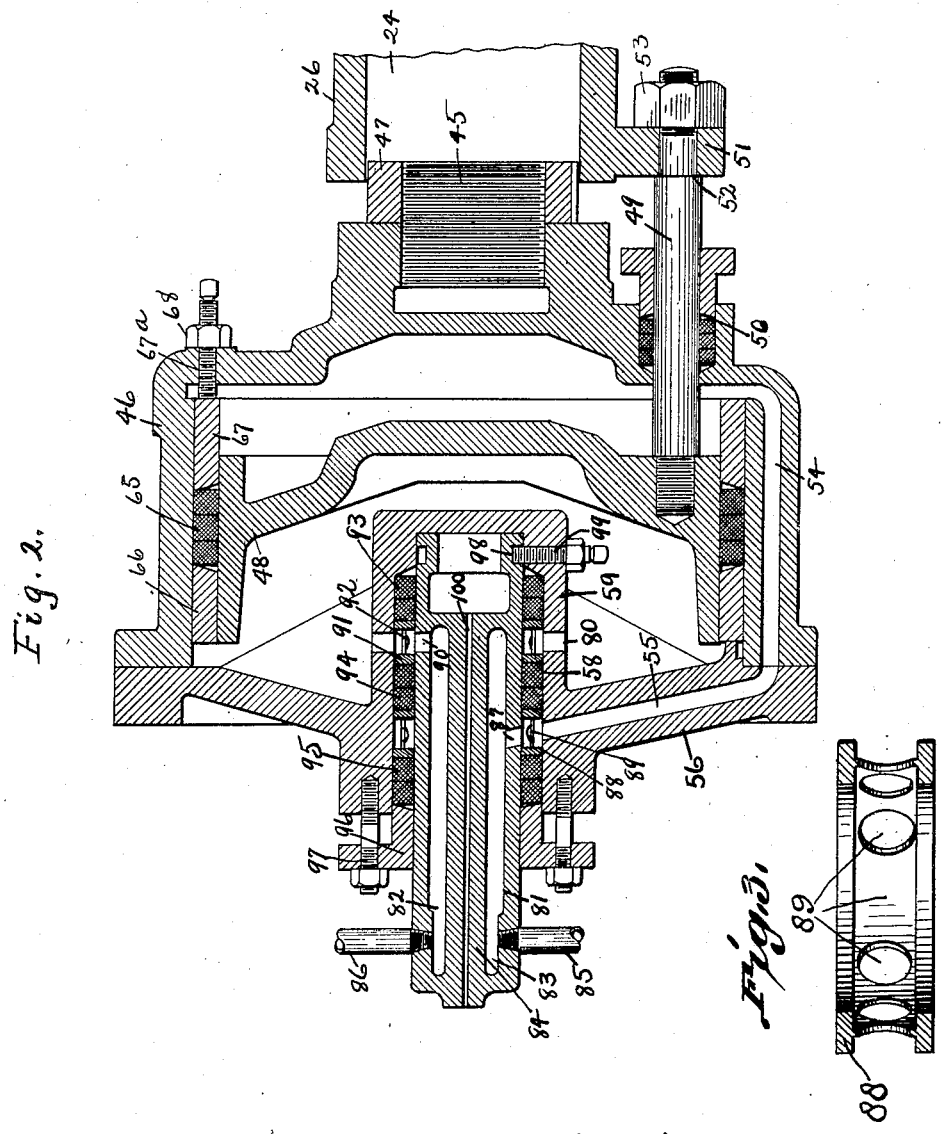

1,520,734

UNITED STATES PATENT OFFICE.

HARRY L. TURNEY, OF PORTLAND, OREGON.

DRIVING MECHANISM.

Application filed October 13, 1920, Serial No. 416,599. Renewed September 25, 1924.

*To all whom it may concern:*

Be it known that I, HARRY L. TURNEY, a citizen of the United States, residing at Portland, in the county of Multnomah and State of Oregon, have invented new and useful Improvements in Driving Mechanism, of which the following is a specification.

The driving mechanism is well adapted for use in logging engines and in the following specification it is so exemplified. In operating logging engines it is desirable to give to the main drum different speeds so that the heavier loads may be handled with the low gearing and the lighter loads handled at the higher speed and higher gearing. It is desirable to be able to change the speed instantly to take care of varying conditions in the travel of the cable and its load. This invention involves the simplification of the mechanism for handling the clutches controlling such mechanism.

The invention is illustrated in the accompanying drawings as follows:—

Fig. 1 shows a plan view of the logging engine.

Fig. 2 a section on the line 2—2 in Fig. 1.

Fig. 3 an enlarged sectional view of a gland spacing and port connecting ring.

The frame is made up of the side beams 1 and 2, the central longitudinal beam 3, and the cross beams 4 and 5. A boiler 8 is mounted on the frame and supplies the engines 9, the connecting rods 9ª extending from the engines to the cranks 10. The cranks are mounted on a shaft 11 and the shaft 11 is journaled in the bearings 12. The main drum 14 is mounted on a shaft 15. The shaft 15 is journaled in the bearings 15ª—15ª on the beams 1 and 3. The drum has the friction surfaces 16 which engage friction surfaces 17 on a gear wheel 18. A thrust collar 19 is mounted on the shaft 15 against the drum 14. A key 20 operates on the thrust collar and a thrust pin 21 of a friction device operates on the key.

An internal gear 22 is formed on the gear wheel 18 and is in mesh with a pinion 23 fixed on a shaft 24. The shaft 24 is mounted in the bearing 25 on the beam 3 and in a sleeve 26 on the beam 2, the sleeve 26 being journaled in a bearing 27. A driver 28 is fixed on the shaft 24 by means of a key 29. The driver is provided with the oppositely faced friction surfaces 30 and 31. The friction surfaces 30 and 31 are engaged by the friction surfaces 32 and 33 on the gears 34 and 35 respectively. The gear 35 is mounted on a collar 36 slidingly mounted on the shaft 24. The collar has the shoulders 37 and 38 for locking the gear 35 against axial movement on the collar. The gear 34 is mounted on a head 39 on the sleeve 26 and the annular shoulders 40 and 41 lock the gear 34 against axial movement on the head 39. A rod 42 is screwed into the head 39 and extends through the collar 36, the rod being provided with a shoulder 43 at one side of the collar and a nut 44 at the opposite side to lock the collar axially with the rod. The outer end of the shaft 24 is reduced and screw-threaded at 45 and a cylinder 46 is screwed on to the end of the shaft and locked by a jam nut 47. A piston 48 operates in the cylinder. Rods 49 preferably three of them arranged equidistant apart are secured to the piston and extend through the glands 50. The rods extend through a flange 51 on the end of the sleeve 26. The rods have the shoulders 52 engaging one surface of the flange and nuts 53 are secured on the opposite face of the flange so as to secure the rods to the flange.

A port 54 is arranged in the walls of the cylinder and leads from the inner end of the cylinder to a port 55 on the head 56. The port 55 leads to an inlet pocket 58 in a projection 59 on the head of the cylinder. The pocket has the ports 80 which lead from the pocket to the outer end of the cylinder. A nozzle 81 extends into the pocket. The nozzle is provided with the two passages 82 and 83 separated by a wall 84. Supply pipes 85 and 86 lead to the passages 83 and 82 respectively. A lateral opening or port 87 leads through the nozzle laterally from the passage 83 to the pocket 58 opposite the port 55, and a similar passage 90 leads from the passage 82 to the pocket 58 opposite the port 80. A spacing ring 88 is arranged in the pocket between the ports 87 and 55, the ring having openings 89 to permit of a free movement of steam from the port 87 to the port 55. Thus with the cylinder turning and the port 87 stationary steam is delivered to the ring 88 in all positions and the ring forms a passage completing the communication at all times to the port 55. A similar ring 91 with openings 92 is arranged in the pocket between the ports 90 and 80. Packing rings 93 are arranged between the ring 91 and the inner end of the pocket 58. Similar rings 94 are arranged between the rings 88 and 91 maintaining them in proper position relatively to their ports. Packing rings 95 are arranged at the outside of the ring 88. A follower 96 operates on the rings 95, pressure being exerted on the follower by the screws 97. The nozzle has a groove 98 in its inner end in which a screw 99 extends so as to lock the nozzle against displacement endwise. In order to prevent pressure accumulating on the nozzle from the inner end of the pocket due to any leakage a vent passage 100 extends through the wall 84 to the outer end of the nozzle.

In the operation of the device steam is turned into one end or the other of the cylinder and this pressure is communicated through the rods 49 and sleeve 26 to the head 39 and collar 38 and consequently the gears 34 and 35 and friction surfaces 32 and 33. It will readily be seen that either friction surface may be thrown into engagement with the driver and that the action in both directions is motor driven. I do not claim broadly this mechanism in this application. The rods extending from the piston to the sleeve, however, simplify the construction and form one of the features of this invention. It will be noted that the mechanism is self-contained, that is to say, the entire thrust in setting the clutch mechanism is sustained within the mechanism itself and is not carried by any bearing surface.

The gears 34 and 35 mesh with gears 69 and 70 on the drive shaft 11. These gears have different gear ratios, the gears 34 and 69 giving the low speed gear connection and the gears 35 and 70 the high speed connection. Drums 71 and 72 may also be provided for the engine, these drums being mounted on the shaft 73 carried by the frame but the structure of these drums except as they are included in a logging engine form no part of my present invention.

The piston in this structure can be more readily and certainly packed by providing a gland 65 which operates on the outer periphery of the piston. The gland is formed by the followers 66 and 67 one of which may be adjusted by the screws 67ª, the screws being locked in adjustment by a lock nut 68. With this construction a very tight joint may be maintained and the wear may be readily taken up with the screws. Inasmuch as the piston has a very slight travel this form of packing is much more desirable than the ordinary piston rings.

The nozzle 81 carrying the steam provides an efficient joint which can be maintained in a steam-tight condition by means of the packing rings. The slight variation axially due to the compression of the packing rings is not sufficient to displace the spacing rings, the spacing rings being made of sufficient length to take care of this slight movement.

What I claim as new is:—

1. In a driving mechanism, the combination of a clutch mechanism; a shaft on which the clutch mechanism is mounted; a sleeve forming a bearing for the shaft and acting on the clutch mechanism; a bearing for the sleeve; a cylinder mounted on the shaft at the opposite side of the bearing from the clutch mechanism; a piston in the cylinder; and rods connecting the piston with the sleeve.

2. In a driving mechanism, the combination of a shaft; two driving elements mounted on the shaft; a clutch mechanism for locking either of said elements in driving relation with the shaft; a sleeve forming a bearing for the shaft; a bearing for the sleeve; a cylinder mounted on the shaft at the opposite side of the bearing from the clutch mechanism; a piston in the cylinder; and rods connecting the piston with the sleeve.

3. In a driving mechanism, the combination of a clutch mechanism; a motor operating the clutch mechanism comprising a rotating cylinder; an inlet pocket having ports leading to the opposite ends of the cylinder; and a stationary nozzle extending into the pocket having two inlet passages opening in spaced relation axially into the pocket and connecting with the ports.

4. In a driving mechanism, the combination of a clutch mechanism; a motor operating the clutch mechanism comprising a rotating cylinder; an inlet pocket having ports leading to the opposite ends of the cylinder; a stationary nozzle extending into the pocket having two inlet passages opening in spaced relation axially into the pocket and connecting with the ports; and a vent passage leading from the inner end of the pocket.

5. In a driving mechanism, the combination of a clutch mechanism; a motor operating the clutch mechanism comprising a rotating cylinder; an inlet pocket having ports leading to the opposite ends of the cylinder; a stationary nozzle extending into the pocket having two inlet passages opening in spaced relation axially into the pocket and connecting with the ports; and a vent passage leading from the inner end of the pocket through the nozzle.

6. In a driving mechanism, the combination of a clutch mechanism; a motor operating the clutch mechanism comprising a rotating cylinder; an inlet pocket having ports leading to the opposite ends of the cylinder; a stationary nozzle extending into the pocket having two inlet passages opening in spaced relation axially into the pocket and connecting with the ports; ported spacing rings at the openings of the inlet passages; and packing rings between the spacing rings.

7. In a driving mechanism, the combination of a clutch mechanism; a motor operating the clutch mechanism comprising a rotating cylinder; an inlet pocket having ports leading to the opposite ends of the cylinder; a stationary nozzle extending into the pocket having two inlet passages opening in spaced relation axially into the pocket and connecting with the ports; ported spacing rings at the openings of the inlet passages; and packing rings between the spacing rings and the ends of the pocket.

8. In a driving mechanism, the combination of a cylinder; ports leading to the opposite ends of the cylinder; an inlet pocket to which the ports lead; and a nozzle extending into the pocket and having two inlet passages opening in spaced relation axially into the pocket and connecting with the ports.

9. In a driving mechanism, the combination of a cylinder; ports leading to the opposite ends of the cylinder; an inlet pocket to which the ports lead; a nozzle extending into the pocket and having two inlet passages opening in spaced relation axially into the pocket and connecting with the ports; ported spacing rings between the inlet passages and the ports; and packing rings at each side of the spacing rings.

10. In a driving mechanism, the combination of a cylinder; ports leading to the opposite ends of the cylinder; an inlet pocket to which the ports lead; a nozzle extending into the pocket and having two inlet passages opening in spaced relation axially into the pocket and connecting with the ports; ported spacing rings between the openings of the inlet passages and said ports; and packing rings between the spacing rings.

In testimony whereof I have hereunto set my hand.

HARRY L. TURNEY.